United States Patent
Shchemelinin et al.

(10) Patent No.: US 11,138,722 B2
(45) Date of Patent: Oct. 5, 2021

(54) DIFFERENTIAL IMAGING FOR SINGLE-PATH OPTICAL WAFER INSPECTION

(71) Applicant: KLA-Tencor Corporation, Milpitas, CA (US)

(72) Inventors: Anatoly Shchemelinin, Bozeman, MT (US); Ilya Bezel, Mountain View, CA (US); Eugene Shifrin, Sunnyvale, CA (US)

(73) Assignee: KLA-Tencor Corporation, Milpitas, CA (US)

( * ) Notice: Subject to any disclaimer, the term of this patent is extended or adjusted under 35 U.S.C. 154(b) by 0 days.

(21) Appl. No.: 16/229,816

(22) Filed: Dec. 21, 2018

(65) Prior Publication Data

US 2020/0202504 A1     Jun. 25, 2020

(51) Int. Cl.
*G06T 7/00* (2017.01)
*G01N 21/95* (2006.01)
*G01N 21/88* (2006.01)

(52) U.S. Cl.
CPC ......... *G06T 7/001* (2013.01); *G01N 21/8806* (2013.01); *G01N 21/9501* (2013.01); *G06T 2207/30148* (2013.01)

(58) Field of Classification Search
CPC ........... G01N 21/8806; G01N 21/9501; G01N 21/95607; G01N 21/956; G01N 2021/887; G06T 7/001; G06T 7/0044; G06T 7/003; G06T 2207/10061; G06T 2207/30148
See application file for complete search history.

(56) References Cited

U.S. PATENT DOCUMENTS

| | | | | |
|---|---|---|---|---|
| 6,175,645 B1 * | 1/2001 | Elyasaf | ............. | G01N 21/8806 382/147 |
| 6,990,385 B1 * | 1/2006 | Smith | ............. | G01R 31/31717 438/14 |
| 7,671,982 B2 | 3/2010 | Wolters et al. | | |
| 7,787,114 B2 | 8/2010 | Wolters et al. | | |

(Continued)

OTHER PUBLICATIONS

International Search Report dated Apr. 17, 2020, for PCT Application No. PCT/US2019/067701. Filed on Dec. 20, 2019 by KLA-Tencor Corporation, 4 pages.

*Primary Examiner* — Sang H Nguyen
(74) *Attorney, Agent, or Firm* — Joseph S. Spano; Spano Law Group

(57) ABSTRACT

Methods and systems for enhanced defect detection based on images collected by at least two imaging detectors at different times are described. In some embodiments, the time between image measurements is at least 100 microseconds and no more than 10 milliseconds. In one aspect, one or more defects of interest are identified based on a composite image of a measured area generated based on a difference between collected images. In a further aspect, measurement conditions associated with the each imaged location are adjusted to be different for measurements performed by at least two imaging detectors at different times. In some embodiments, the measurement conditions are adjusted during the time between measurements by different imaging detectors. Exemplary changes of measurement conditions include environmental changes at the wafer under measurement and changes made to the optical configuration of the inspection system.

19 Claims, 4 Drawing Sheets

(56) References Cited

U.S. PATENT DOCUMENTS

| | | | |
|---|---|---|---|
| 7,904,845 B2 * | 3/2011 | Fouquet | G03F 7/7065 324/762.05 |
| 8,223,327 B2 * | 7/2012 | Chen | H01L 22/12 356/237.2 |
| 8,605,275 B2 * | 12/2013 | Chen | G01N 21/9501 356/237.2 |
| 9,460,502 B2 * | 10/2016 | Inoue | G06T 7/0004 |
| 9,863,889 B2 | 1/2018 | Amanullah et al. | |
| 2006/0256325 A1 | 11/2006 | Mcmillan et al. | |
| 2008/0239289 A1 * | 10/2008 | Ueno | G01N 21/95607 356/73 |
| 2008/0285023 A1 * | 11/2008 | Tsai | G01N 21/9501 356/237.5 |
| 2009/0225399 A1 | 9/2009 | Zhao et al. | |
| 2010/0002232 A1 | 1/2010 | Eun et al. | |
| 2010/0310152 A1 * | 12/2010 | Wakaba | G01R 31/2887 382/151 |
| 2012/0019835 A1 * | 1/2012 | Nakao | G01N 21/9501 356/600 |
| 2012/0086799 A1 | 4/2012 | Hess | |
| 2013/0140457 A1 * | 6/2013 | Minekawa | H01J 37/26 250/307 |
| 2013/0343632 A1 * | 12/2013 | Urano | G06T 7/001 382/149 |
| 2016/0125583 A1 * | 5/2016 | Amanullah | G06T 7/337 348/87 |
| 2017/0249732 A1 | 8/2017 | Shankar et al. | |
| 2018/0114306 A1 * | 4/2018 | Ogawa | G02B 27/10 |
| 2018/0130199 A1 * | 5/2018 | Brauer | G06T 7/0006 |
| 2018/0202943 A1 | 7/2018 | Chen et al. | |

* cited by examiner

DIFFERENTIAL IMAGING FOR SINGLE-PATH OPTICAL WAFER INSPECTION

TECHNICAL FIELD

The described embodiments relate to systems for surface inspection, and more particularly to differential imaging for optical wafer inspection.

BACKGROUND INFORMATION

Semiconductor devices such as logic and memory devices are typically fabricated by a sequence of processing steps applied to a substrate or wafer. The various features and multiple structural levels of the semiconductor devices are formed by these processing steps. For example, lithography among others is one semiconductor fabrication process that involves generating a pattern on a semiconductor wafer. Additional examples of semiconductor fabrication processes include, but are not limited to, chemical-mechanical polishing, etch, deposition, and ion implantation. Multiple semiconductor devices may be fabricated on a single semiconductor wafer and then separated into individual semiconductor devices.

Inspection processes are used at various steps during a semiconductor manufacturing process to detect defects on wafers to promote higher yield. As design rules and process windows continue to shrink in size, inspection systems are required to capture a wider range of physical defects on wafer surfaces while maintaining high throughput.

In general, optical wafer inspection involves collecting images of a wafer and detecting irregularities in the detected images. Typically, a semiconductor wafer includes multiple die, fabricated adjacent to one another. In a perfect manufacturing scenario, each die are identical, and thus, the wafer image should have a perfect periodic structure. Irregularities detected in the wafer image are caused by defects in the periodic structure of the wafer. These defects are targets of the wafer inspection.

The collected wafer image is affected by noise and is therefore never perfectly periodic. Some of the noise is introduced by imperfections of the wafer inspection tool. In addition, a significant source of measurement noise is due to actual wafer defects that do not have a significant impact on the functionality of the manufactured semiconductor device. These insignificant defects are commonly referred to as "nuisance" defects. Other defects do have a significant impact on the functionality of the manufactured semiconductor device. These significant defects are commonly referred to as "defects of interest" (DOI).

In general, the goal of wafer inspection is to capture as many defects of interest as possible and as few nuisance defects as possible. Over time, wafer inspection tools have evolved in an on-going effort to boost DOI visibility and suppress nuisance defects. However, improvements to wafer inspection systems are desired to gather additional signal information useful for improving sensitivity to DOIs, and distinguishing between DOIs and nuisance defects.

SUMMARY

Methods and systems for enhancing defect detection based on images collected by at least two imaging detectors at different times are described herein. In one aspect, the area of a wafer under measurement is measured by at least two imaging detectors at different times and a composite image is generated based on the collected images. In some embodiments, the composite image is based on a difference between the collected images. In some embodiments, the time between image measurements is at least 100 microseconds and no more than 10 milliseconds.

In another aspect, the fields of view associated with each of the multiple detectors are separated on the wafer. Furthermore, each of the multiple detectors images different portions of the wafer simultaneously. In this manner, measurement throughput remains high even though each location on wafer is imaged at least twice.

In a further aspect, the measurement conditions associated with the measurements of each location on the wafer are adjusted such that the measurement conditions are different for the measurements performed by at least two imaging detectors at different times. This, in turn, enhances defect detection performance by increasing the amount of signal information associated with each measured location. In some embodiments, the measurement conditions are adjusted during the time between measurements by different imaging detectors. This, in turn, enhances defect detection performance by increasing the amount of signal information associated with each measured location. Exemplary changes of measurement conditions include environmental changes at the wafer under measurement and changes made to the configuration of the inspection system, e.g., optical adjustments, focus adjustments, etc.

In some embodiments, additional sets of imaging detectors are employed to improve throughput. In some embodiments, a measured area of a wafer may be moved across the fields of view of any number of different imaging detectors to image the measured area any number of different times.

In another aspect, a semiconductor wafer inspection system includes an image combining device that generates a composite image based on the signals associated with each independent image of the measured area. In some embodiments, the image combining device generates the composite image on a pixel by pixel basis to minimize memory requirements and compute time. In preferred embodiments, a composite image includes a difference between signals associated with measurements of each particular location on the wafer by the at least two imaging detectors. Defect detection of some objects is enhanced based on differential images because the changes between images of the same location are highlighted in a differential image.

In a further aspect, a computing system is configured to identify one or more defects of interest on a semiconductor wafer based on a composite image of a measured area.

The foregoing is a summary and thus contains, by necessity, simplifications, generalizations and omissions of detail; consequently, those skilled in the art will appreciate that the summary is illustrative only and is not limiting in any way. Other aspects, inventive features, and advantages of the devices and/or processes described herein will become apparent in the non-limiting detailed description set forth herein.

DETAILED DESCRIPTION

Reference will now be made in detail to background examples and some embodiments of the invention, examples of which are illustrated in the accompanying drawings.

Methods and systems for enhancing optical wafer inspection without sacrificing measurement throughput are described herein. In one aspect, the area of a wafer under measurement is measured by at least two imaging detectors at different times and a composite image is generated based on the collected images. In some embodiments, the composite image is based on a difference between the collected images. Multiple images of the same measurement area increases signal information that allows improved separation between DOI and nuisance defects. The time between measurements is at least 100 microseconds and no more than 10 milliseconds. By maintaining a short, fixed time between imaging of a particular wafer location with each detector, noise induced by the measurement system itself is minimized. For example, unmodelled wafer position errors, focus errors, etc. are common among all images of a particular wafer location, while systematic misalignments among different imaging detectors may be precisely calibrated in advance.

In another aspect, the fields of view associated with each of the multiple detectors are separated on the wafer. Furthermore, each of the multiple detectors images different portions of the wafer simultaneously. In this manner, measurement throughput remains high even though each location on wafer is imaged at least twice.

In a further aspect, the measurement conditions associated with the measurements of each location on the wafer are adjusted such that the measurement conditions are different for the measurements performed by the at least two imaging detectors at different times. In some embodiments, the measurement conditions are adjusted during the time between measurements by the at least two imaging detectors. This, in turn, enhances defect detection performance by increasing the amount of signal information associated with each measured location.

Figure 1:
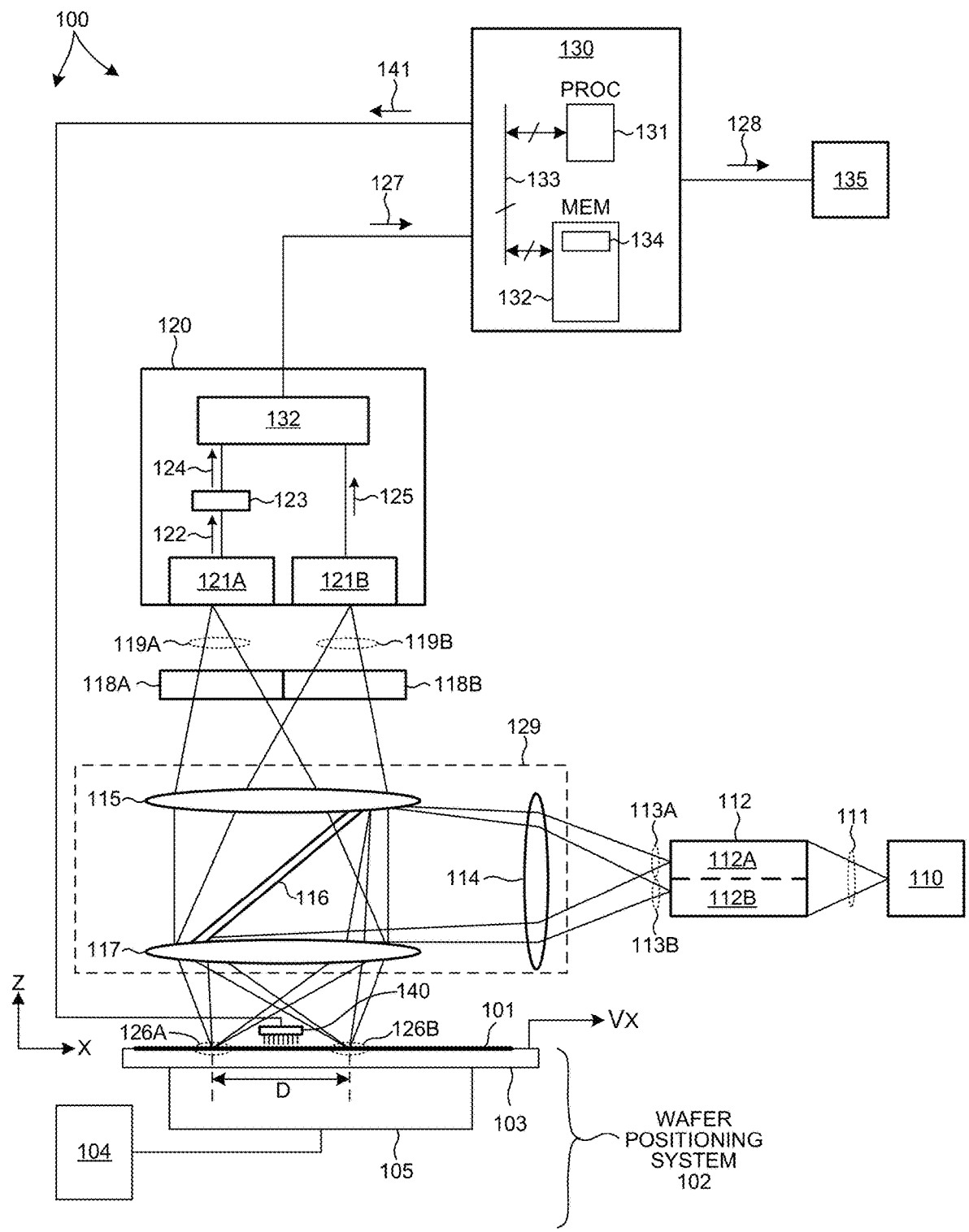
FIG. 1 is a simplified diagram illustrative of one embodiment of a multiple zone imaging inspection system 100 that may be used to perform the inspection methods described herein.

FIG. 1 is a simplified diagram illustrative of a semiconductor wafer inspection system 100 including multiple detectors in at least one novel aspect. For simplification, some optical components of the system have been omitted. By way of example, folding mirrors, polarizers, beam forming optics, additional light sources, additional collectors, and detectors may also be included. All such variations are within the scope of the invention described herein. The inspection system described herein may be used for inspecting patterned, as well as unpatterned wafers.

As illustrated in FIG. 1, wafer inspection system 100 includes an illumination source 110. Illumination source 110 may include, by way of example, a laser driven plasma light source, a laser, a diode laser, a helium neon laser, an argon laser, a solid state laser, a diode pumped solid state (DPSS) laser, a xenon arc lamp, a gas discharging lamp, an LED array, or an incandescent lamp. The light source may be configured to emit near monochromatic light or broadband light.

As depicted in FIG. 1, illumination optics 112 direct illumination light 111 from illumination source 110 to objective 129. In one aspect, illumination optics 112 include multiple optical zones (e.g., zones 112A and 112B) that each generate an illumination beam directed toward objective 129. This enables independent selection of illumination conditions associated with each imaging detector.

Each of the illumination beams (e.g., illumination beams 113A and 113B) are spatially separated from one another at a field plane of illumination optics 112 conjugate to the field plane at the surface of wafer 101. In some embodiments, optical zones 112A and 112B include shared optical elements. In some embodiments, optical zones 112A and 112B include separate optical elements associated with illumination beams 113A and 113B. In some embodiments, illumination optics 112 includes a diffractive optical element to generate the desired number of illumination beams at the desired size and spacing. The size, number, and spacing between illumination beams may be determined by a user or may be automatically generated by wafer inspection system 100.

As depicted in FIG. 1, objective 129 includes lenses 114, 115, 117, and beam splitting element 116. In some embodiments, the elements of objective 129 are integrated into a single opto-mechanical package. Objective 129 focuses illumination beams 113A and 113B onto distinct measurement locations 126A and 126B, respectively. As depicted in FIG. 1, measurement locations 126A and 126B are separated by distance, D.

In general, illumination beams 113A and 113B may differ from one another in polarization, intensity, size and shape of the spot, pupil image, etc., for example, by the use of different polarizers, filters, apertures, etc. in each zone of illumination optics 112. Also, the illumination beams incident on wafer 101 at measurement areas 126A and 126B may differ from illumination beams 113A and 113B, respectively, in polarization, intensity, size and shape of the spot, pupil image, etc., for example, by the use of polarizers, filters, apertures, etc. located in the illumination path from illumination optics 112 to wafer 101.

Objective 129 collects light 119A and 119B from measurement locations 126A and 126B in response to the incident illumination light and directs the collected light to imaging detectors 121A and 121B, respectively. The collected light 119A and 119B passes through one or more collection optical elements 118A and 118B, respectively. In some embodiments, collection optical elements 118A and 118B include shared optical elements. In some embodiments, collection optical elements 118A and 118B include separate optical elements associated with collected beams 119A and 119B. This enables independent selection of collection conditions associated with each imaging detector.

In some embodiments, collection optical elements 118A and 118B include image filter elements that limit the range of wavelengths of light directed to imaging detectors 121A and 121B, respectively. The image filter elements may be bandpass filters and/or edge filters and/or notch filters. In some embodiments, each of the image filter elements 118A and 118B include different spectral filters and collected light 119A and 119B incident on imaging detectors 121A and 121B, respectively, have different spectral characteristics (e.g., different wavelength ranges). In general, collected light 119A and 119B may differ from one another in polarization, intensity, size and shape of the spot, pupil image, etc., for example, by the use of different polarizers, filters, apertures, etc. in collection optical elements 118A and 118B.

As depicted in FIG. 1, semiconductor wafer inspection system 100 includes a wafer positioning system 102 that moves wafer 101 within the field of view of imaging detectors 121A and 121B. In some embodiments, wafer positioning system 102 moves wafer 101 in a scanning motion in the X-direction. In this manner, the field of view of imaging detector 121A and the field of view of imaging detector 121B move across the semiconductor wafer in the X-direction. In the embodiment depicted in FIG. 1, the field of view of imaging detector 121A is located ahead of the field of view of imaging detector 121B by distance, D.

Figure 2:
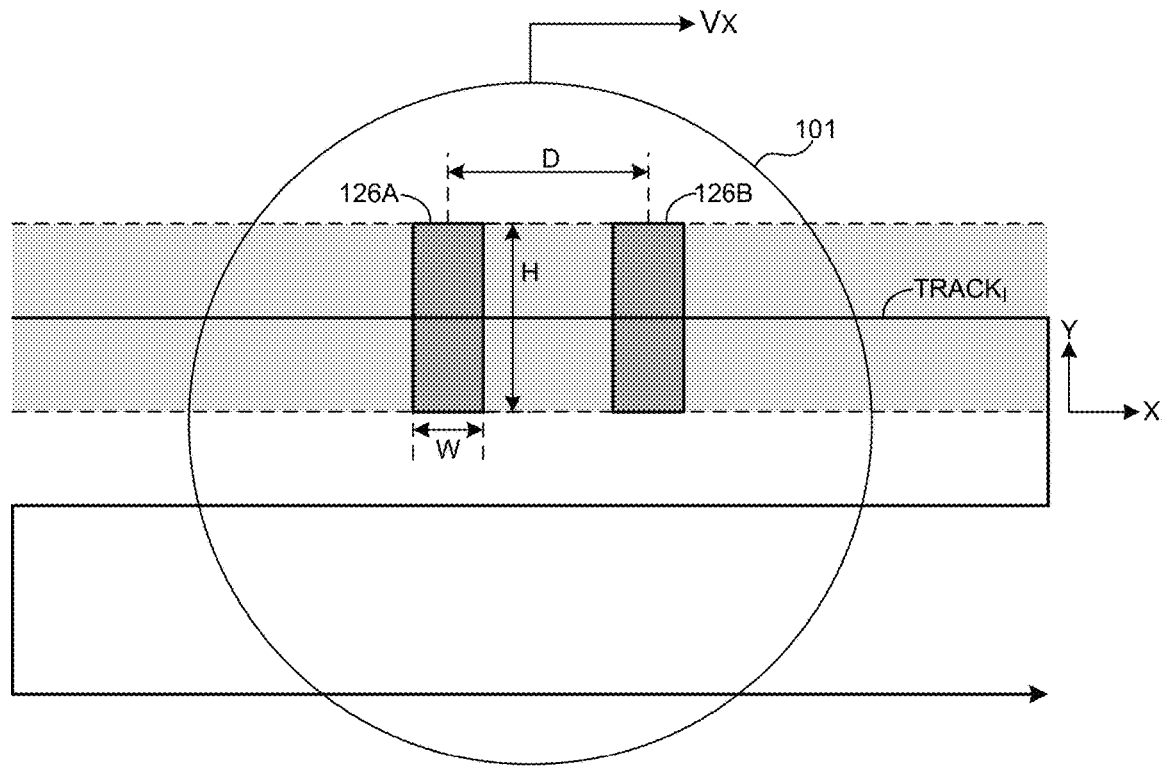
FIG. 2 is a simplified diagram illustrative of a wafer 101 imaged by multiple imaging detectors at different times along an inspection track in one embodiment.

In an exemplary operational scenario, inspection begins with wafer 101 entering the field of view of detector 121A. Wafer 101 is translated in the X-direction until wafer 101 passes through the field of view of detector 121B. Due to the translation of wafer 101 in the X-direction by wafer positioning system 102, the locus of measurement locations detected within the field of view of imaging detector 121A and also imaging detector 121B traces a swath across the surface of wafer 101 in the X-direction. The swath on the surface of wafer 101 is referred to as an inspection track. FIG. 2 depicts measurement location 126A within the field of view of imaging detector 121A and measurement location 126B within the field of view of imaging detector 121B at an instant in time. Inspection track, $Track_i$, illustrates the swath of imaged area across the surface of wafer 101 due to a single scan in the X-direction. In some embodiments, wafer positioning system 102 repeatedly translates wafer 101 in the Y-direction, and scans wafer 101 in the X direction to inspect the entire wafer area of wafer 101.

In general, wafer 101 may be moved across the fields of view of imaging detectors 121A and 121B in many other operational modes. In some embodiments, wafer positioning system 102 is a rotational stage system that rotates wafer 101 about a center of rotation and translates the center of rotation such that the inspection track is a spiral pattern. In some embodiments, wafer 101 is moved in a stepwise fashion. In these embodiments, wafer 101 is moved to a position, measured, moved to another position, measured, in a repeated manner until the area of wafer 101 is imaged by both detectors 121A and 121B.

Figure 3:
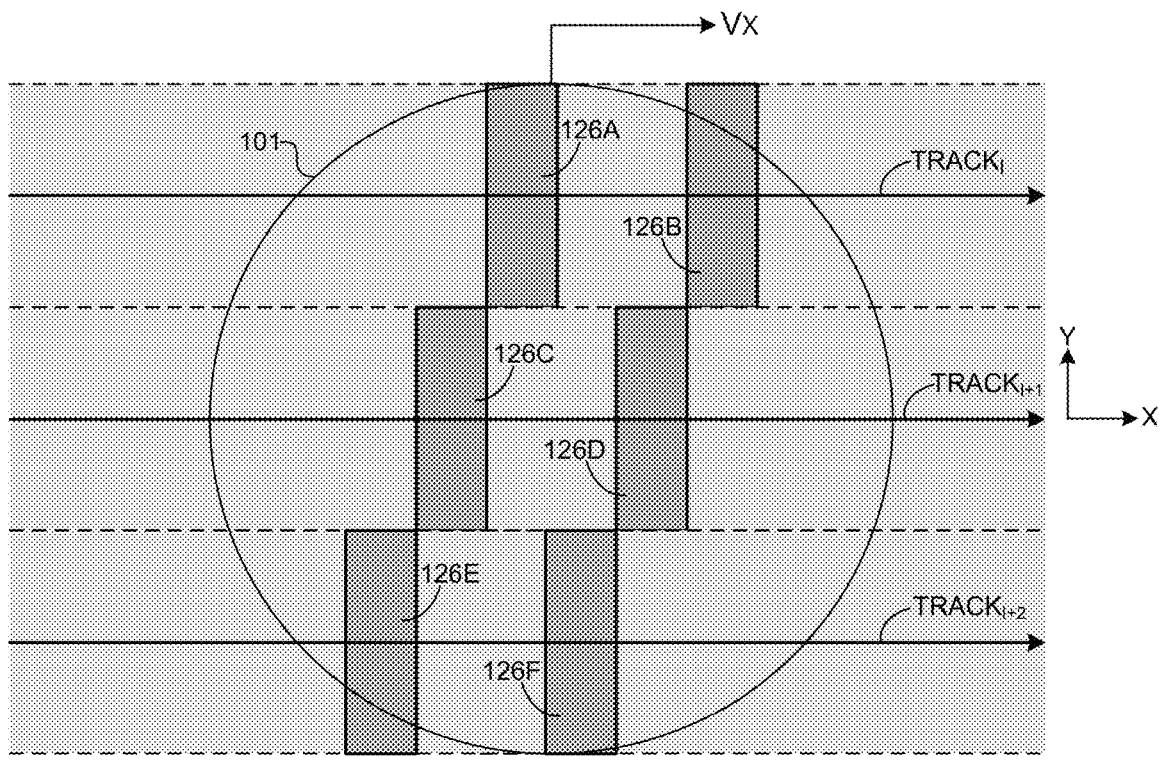
FIG. 3 is a simplified diagram illustrative of a wafer 101 imaged by multiple imaging detectors at different times along several inspection tracks in one embodiment.

In some embodiments, additional sets of imaging detectors are employed to improve throughput. For example, FIG. 3 illustrates the measurement areas 126A-F associated with the fields of view of three sets of two imaging detectors. The locus of measurement locations detected within the fields of view of a pair of imaging detectors (e.g., imaging detectors 121A and 121B) traces a swath associated with $Track_i$. The locus of measurement locations detected within the fields of view of another pair of imaging detectors traces a swath associated with $Track_{i+1}$. The locus of measurement locations detected within the fields of view of yet another pair of imaging detectors traces a swath associated with $Track_{i+2}$. All six imaging detectors collect measurement data simultaneously as the wafer 101 is translated in the X-direction by wafer positioning system 102. In the embodiment depicted in FIG. 3, wafer positioning system 102 scans wafer 101 in the X direction one time to inspect the entire wafer area of wafer 101.

Figure 4:
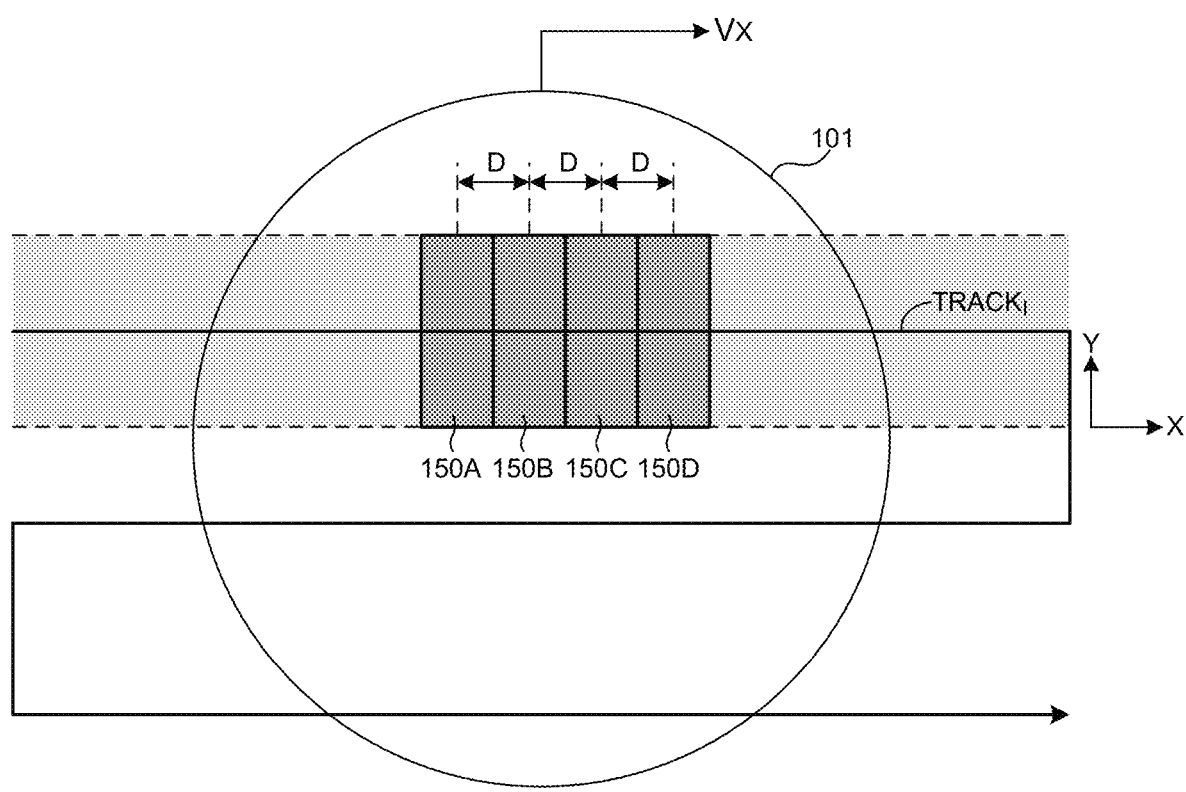
FIG. 4 is a simplified diagram illustrative of the fields of view of four imaging detectors at the surface of a wafer 101 in one embodiment.

In the embodiments described with reference to FIG. 1 and FIG. 2, a measured area of wafer 101 is moved across the fields of view of two imaging detectors. In general, however, a measured area of wafer 101 may be moved across the fields of view of any number of different imaging detectors to image a measured area of wafer 101 any number of different times. FIG. 4 depicts the measurement areas 150A-D associated with the fields of view of four imaging detector zones of a multiple zone imaging detector device at an instant in time. As depicted in FIG. 4, the locus of measurement locations detected within the fields of view of the four imaging detectors traces a swath associated with $Track_i$. In this manner, the measured area of wafer 101 is separately imaged at four different times. In some embodiments, a multiple zone imaging detector device includes multiple, small imaging detector zones (e.g., single pixel column resolution) that generate a large number of images of each measured location on wafer 101. In one embodiment, a two dimensional CMOS detector is subdivided into multiple, small imaging detector zones. Since each pixel of a CMOS detector is independently addressable, images are collected independently by separate detector electronics associated with each of the imaging detector zones.

In some embodiments, wafer inspection system 100 may include a deflector (not shown) that scans the illumination beams over the surface of wafer 101 instead of, or in addition to, the movement of wafer 101 by wafer positioning system 102. In one embodiment, the deflector may be an acousto-optical deflector (AOD). In other embodiments, the deflector may include a mechanical scanning assembly, an electronic scanner, a rotating mirror, a polygon based scanner, a resonant scanner, a piezoelectric scanner, a galvo mirror, or a galvanometer. The deflector scans the light beam over the specimen. In some embodiments, the deflector may scan the light beam over the specimen at an approximately constant scanning speed.

As depicted in FIG. 2, the measurement areas 126A and 126B within the fields of view of imaging detectors 121A and 121B, respectively, are characterized by a height, H, and a width, W. In general, H and W may be any suitable dimensions. In some examples, H extends over a relatively large number of image pixels and W is the width of a single pixel. In other examples, W is the width of multiple pixels, and imaging detectors 121A and 121B collect light over a two dimensional array of pixels. In some examples, H, may extend all the way across wafer 101 (e.g., at least 300 millimeters). In some examples, W, may also extend all the way across wafer 101 (e.g., at least 300 millimeters).

In some embodiments, imaging detectors 121A and 121B are charge-coupled device (CCD) detectors. In some embodiments, imaging detectors 121A and 121B are complementary metal on silicon (CMOS) detectors.

In some embodiments, imaging detectors 121A and 121B are integrated into a multiple zone detector device. In some other embodiments, imaging detectors 121A and 121B are each stand-alone devices.

In some embodiments, imaging detectors 121A and 121B operate in a time delay integration (TDI) mode to increase signal to noise ratio. In these embodiments, each measurement location is measured by each pixel across the width dimension, W, and the measured signals associated with each measurement location are summed to arrive at the image signal associated with each particular measurement location.

In some embodiments, imaging detectors 121A and 121B operate in a step and flash mode or scan and flash mode. In some embodiments, imaging detectors 121A and 121B operate in a line scanning mode (e.g., field of view having a width of one pixel scanned across the wafer).

In another aspect, a semiconductor wafer inspection system includes an image combining device that generates a composite image based on the signals associated with each independent image of the measured area. In some embodiments, the image combining device generates the composite image on a pixel by pixel basis to minimize memory requirements and compute time.

In preferred embodiments, a composite image includes a difference between signals associated with measurements of each particular location on the wafer by the at least two imaging detectors. In some embodiments, defect detection is based on a differential image of a measured area of wafer 101, e.g., $I_1-I_2$, generated by subtracting signals associated with measurements of each particular location on the wafer by one imaging detector from the measurements of each particular location on the wafer by another imaging detector. Defect detection of some objects is enhanced based on differential images because the changes between images of the same location are highlighted in a differential image. The enhancement of defect detection is particularly apparent when measurement conditions, such as environmental conditions at the wafer, measurement system configuration, etc., are changed between measurements performed by two different imaging detectors.

FIG. 2 depicts the measurement area 126A within the field of view associated with imaging detector 121A and the measurement area 126B within the field of view associated with imaging detector 121B at an instant in time. At a particular instance in time, $T_1$, the measurement area 126A corresponds to a particular measurement location and the measurement area 126B corresponds to a different, spatially distinct measurement location. However, since each measurement location is imaged by both imaging detectors 121A and 121B at different times, there is another instance in time, $T_2$, when the measurement area 126B corresponds to the same particular measurement location imaged by detector 121A at time, $T_1$. Thus, in this example, each location on wafer 101 is independently imaged two different times, and the time elapsed, $\Delta T$, between the imaging of the particular measurement location is $D/V_X$.

As depicted in FIG. 1, multiple zone imaging detector device 120 includes imaging detectors 121A and 121B, delay module 123, and arithmetic processing unit (APU) 132. Image signals 122 associated with the optical images detected by imaging detector 121A are communicated to delay module 123. Delay module 123 introduces a time delay, $\Delta T$, which corresponds to the time elapsed, $\Delta T$, between the imaging of the particular measurement location. In this manner, the images detected by detector 121A are delayed by precisely the amount of time it takes for an image of a measurement location on wafer 101 to travel between imaging detectors 121A and 121B. Thus, the time delay, $\Delta T$, is defined by the wafer motion. Delayed image signals 124 are communicated to arithmetic processing unit 132. In addition, image signals 125 associated with the optical images detected by imaging detector 121B are communicated to arithmetic processing unit 132.

In the embodiment depicted in FIG. 1, a composite image 127 is generated based on the signals 124 and 125 associated with measurements of each measured location on the wafer by imaging detectors 121A and 121B, respectively. In some embodiments, it is preferred that APU 132 operate on analog image signals or amplified, analog image signals to reduce digitization noise. In some embodiments, arithmetic processing unit 132 operates directly on analog image signals (e.g., charge signals) generated by imaging detectors 121A and 121B. In some of these embodiments, a differential image is generated pixel by pixel by charge subtraction on the chip level. In these embodiments, the accumulated in-well charge reflects the differential signal. This dramatically increases effective well size and enables the detection of differential signals that would not be detectable by calculating the difference of two digital images in a post-processing step. In some embodiments, the analog image signals are amplified by analog isolating amplifiers before processing by APU 132. In these embodiments, analog isolating amplifiers are employed to convert charge signals to voltage signals to reduce noise, increase amplitude, enable additional analog filtering, etc., before processing by APU 132. In some other embodiments, analog image signals are converted to digital signals before processing by APU 132. Although, the analog to digital conversion introduces digitization noise, the resulting digital signals are more stable and are more easily stored in memory, which enables the implementation of a wider range of data processing algorithms. Furthermore, signal processing algorithms can be implemented programmatically by APU 132 when APU 132 operates on digital image signals.

In some embodiments, APU 132 generates a differential image 127 that includes a difference between signals associated with measurements of each particular location on the wafer by the two imaging detectors, e.g., $I_1-I_2$. In some embodiments, APU 132 generates a normalized differential image 127, e.g., $(I_1-I_2)/(I_1+I_2)$. In some embodiments, APU 132 generates an averaged image 127, e.g., $(I_1+I_2)/2$. In some embodiments, APU 132 extends the dynamic range of one or more signals, e.g., when illumination intensity associated with the field of view of each imaging detector differs. In one example, APU 132 extends the dynamic range of a signal by multiplying the signal by constant value, e.g., $(I_1-K*I_2)$. In general, APU 132 may be employed to generate a composite image based on any suitable algorithm.

In a further aspect, a computing system is configured to identify one or more defects of interest on a semiconductor wafer based on a composite image of a measured area. As depicted in FIG. 1, computing system 130 receives a composite image 127 from multiple zone imaging detector device 120 and determines a location of one or more defects on semiconductor wafer 101. Moreover, computing system 130 communicates signals 128 indicative of the determined defect locations to memory 135. Memory 135 stores the defect locations for further analysis, reporting, etc.

In a further aspect, the measurement conditions associated with measurements of each location on the wafer are adjusted such that the measurement conditions are different for the measurements performed by each imaging detector. In some embodiments, the measurement conditions are adjusted during the time between measurements by different imaging detectors. This, in turn, enhances defect detection performance by increasing the amount of signal information associated with each measured location. Exemplary changes of measurement conditions include environmental changes at the wafer under measurement and changes made to the configuration of the inspection system, e.g., optical adjustments, focus adjustments, etc.

In some embodiments, illumination of a measured location within the field of view of an imaging detector induces heating of the illuminated structures due to the incidence of high intensity photons at high flux. During the time between imaging by two different imaging detectors, (e.g., one millisecond), the induced heat spreads through the structures under measurement and stabilizes across the wafer surface. As a result, the temperature of the wafer at the measured location increases to a higher temperature at the time of imaging of the measurement location by the second imaging detector.

FIG. 1 depicts wafer conditioning device 140 located in close proximity to the surface of wafer 101. Wafer conditioning device 140 changes an environmental condition of the measured area between a time when the first image of the measured area is detected and a time when the second image of the measured area is detected. Command signals 141 are communicated from computing system 130 to wafer conditioning device 140. In response to command signals 141, wafer conditioning device 140 changes the environmental condition (e.g., temperature, humidity, electric field, etc.) at the wafer surface.

In some embodiments, wafer conditioning device 140 is a heating device that increases the temperature of the wafer as the wafer passes. The heating device may be a radiator that induces thermal heating of the wafer, a photon emitting device that induces thermal heating of the wafer, etc.

In some embodiments, wafer conditioning device 140 is a humidification device that humidifies the local environment around the measured area. In some embodiments, the humidification device subjects the measured area to a flow of purge gas that includes a controlled amount of fill material (e.g., water). A portion of the fill material (i.e., the condensate) condenses onto the structures under measurement and fills openings in the structural features, openings between structural features, etc. The presence of the condensate changes the optical properties of the structure under measurement compared to a measurement performed when the structure is devoid of any fill material.

In some embodiments, the humidification device includes a jet that delivers humid, clean air just in front of the field of view of imaging detector 121A. The humid, clean air jet is isolated from the optical elements to eliminate the potential for contamination of the optical elements. In another embodiment, the humid, clean air jet delivers humid, clean air just in front of the field of view of imaging detector 121B. In the humid environment, condensate quickly fills the wafer structure. Immediately after passing by the humidification device, the filled structures are imaged by imaging detector 121B. In addition, the measured structures are now subjected to a dry environment, along with heating due to illumination during imaging by imaging detector 121B. Evaporation of the fill material begins immediately after the filled structures are subjected to the dry environment and continues during the time the measured area moves from the field of view of imaging detector 121B to the field of view of imaging detector 121A (e.g. approximately one millisecond) By the time the measured area is within the field of view of imaging detector 121A, the fill material (e.g., water, alcohol, etc.) is evaporated, and the unfilled structures are imaged by imaging detector 121A. For inspection scenarios where the fields of view of two imaging detectors are adjacent to one another on the wafer, the wafer is completely filled when entering the field of view of the first imaging detector (after treatment by the humidification device), mostly filled when leaving the field of view of the first imaging detector and entering the field of view of the second imaging detector, and mostly or completely unfilled when leaving the field of view of the second imaging detector.

Filling structural features by condensate, for example, strongly influences the measured images, especially at wavelengths in the vacuum ultraviolet (VUV) range. Thus, defect detection based on a differential image, e.g., $I_1-I_2$, generated based on an image of filled structures, $I_1$, and unfilled structures, $I_2$, enables improved high throughput wafer inspection. It is expected that the most significant image differences occur at small structural gaps that are filled while being imaged by one imaging detector, and mostly or completely dry (unfilled) when imaged by another imaging detector. Hence, the differential image is especially sensitive to the absence of a small gap, an extra gap, or a significant change of gap size. Each of these defect scenarios are important targets of wafer inspection and can be difficult to detect with existing wafer inspection systems.

In some embodiments, wafer conditioning device 140 is an electric field generator that introduces a local electric field on the wafer. The applied electric field may be constant or periodic, for example, in the radio frequency (RF) range or microwave range. In some embodiments, the electric field generator includes electrodes incorporated in the housing of the objective lens. In some embodiments, the back side of the wafer can be used as an electrode. The presence of the local electric field changes the reflectivity of structural features that are very sensitive to electric field, and thus, enhances the sensitivity of differential images of those features.

In some embodiments, the electric field generator introduces an electric field on the wafer within the field of view of imaging detector 121A, while no electric field is introduced on the wafer within the field of view of imaging detector 121B. A differential image 127 is generated based on the difference between image signals associated with a measured area when imaged by imaging detector 121A and when imaged by imaging detector 121B.

In some embodiments, the illumination and detection settings are the same for images detected within the fields of view of imaging detectors 121A and 121B. However, in another aspect, the illumination and detection settings differ for images detected within the fields of view of imaging detectors 121A and 121B. By way of example, differences include any of optical intensity, wavelength spectrum, polarization, pupil image, or a combination thereof. The differences in optical settings enhance the sensitivity of differential images of features that exhibit sensitivity to different optical measurement conditions.

In some embodiments, the illumination optics 112 are configured to direct light having a relatively narrow wavelength band to the specimen (e.g., nearly monochromatic light or light having a wavelength range of less than about 20 nm, less than about 10 nm, less than about 5 nm, or even less than about 2 nm). Therefore, if the light source is a broadband light source, the illumination optics 112 may also include one or more spectral filters that may limit the wavelength of the light directed to the specimen. The one or more spectral filters may be bandpass filters and/or edge filters and/or notch filters. In some embodiments, each of optical zones 112A and 112B include different spectral filters and generate illumination light 113A and 113B having different spectral characteristics (e.g., different wavelength ranges).

In another aspect, the focus offset is adjusted to be different for images detected within the fields of view of imaging detectors 121A and 121B. In some embodiments, each imaging detector is located at a different focal plane. This approach may be implemented when each imaging detector is packaged as a stand-alone detector device. In some embodiments, each imaging detector is located along a plane that is tilted with respect to the focal plane. This approach may be implemented when each imaging detector is packaged as part of an integrated, multiple zone imaging detector device. In some embodiments, the wafer itself is tilted with respect to the focal plane, such that the focus offset associated with a particular measured area is different when imaged within the field of view of detector 121A and when imaged within the field of view of detector 121B. Differential images of a measurement area imaged at different focus offsets exhibit enhanced phase contrast and can also be used as the basis for an interferometry inspection mode.

Although, many changes in measurement conditions are visible in differential images as described herein, in some examples, changes in measurement conditions are visible in composite images generated by averaging. In these examples, a composite image is generated as an average of images detected by different imaging detectors and different times, e.g., $I_1+I_2/2$. With a change of measurement conditions between images, some image features may change because of the change of measurement conditions and will be blurred by averaging. However, other image features may not change and will be enhanced.

Any of the illumination and collection optics described herein may be a lens, a compound lens, or any appropriate lens known in the art. Alternatively, any of the illumination and collection optics described herein may be a reflective or partially reflective optical component, such as a mirror. In addition, although particular collection angles are illustrated in FIG. 1, it is to be understood that the collection optics may be arranged at any appropriate collection angle. The collection angle may vary depending upon, for example, the angle of incidence and/or topographical characteristics of the specimen.

Each imaging detector generally functions to convert the scattered light into an electrical signal, and therefore, may include substantially any photodetector known in the art. However, a particular detector may be selected for use within one or more embodiments of the invention based on desired performance characteristics of the detector, the type of specimen to be inspected, and the configuration of the illumination. For example, if the amount of light available for inspection is relatively low, an efficiency enhancing detector such as a time delay integration (TDI) camera may increase the signal-to-noise ratio and throughput of the system. However, other detectors such as charge-coupled device (CCD) cameras, photodiode arrays, phototube and photomultiplier tube (PMTs) arrays may be used, depending on the amount of light available for inspection and the type of inspection being performed. The term "imaging detector" is used herein to describe a detector having a sensing area, or possibly several sensing areas (e.g., a detector array or multi-anode PMT). Regardless of number, the sensing areas of an imaging detector generate image signals independent from any other imaging detector.

Wafer inspection system 100 also includes various electronic components (not shown) needed for processing the scattered signals detected by imaging detectors 121A and 121B. For example, wafer inspection system 100 may include amplifier circuitry to receive output signals from any of detectors 121A and 121B, and to amplify those output signals by a predetermined amount and an analog-to-digital converter (ADC) to convert the amplified signals into a digital format suitable for use within processor 131.

In general, processor 131 is configured to detect features, defects, or light scattering properties of the wafer using composite images. The composite images are generated based on the image signals produced by imaging detectors 121A and 121B. The composite images may be generated by detector 120 as described hereinbefore, or may be generated by computing system 130 based on the image signals produced by imaging detectors 121A and 121B. In this manner, the functionality of arithmetic processing unit 132 may by implemented by computing system 130 in some embodiments. The processor may include any appropriate processor known in the art. In addition, the processor may be configured to use any appropriate defect detection algorithm or method known in the art. For example, the processor may use a die-to-database comparison or a thresholding algorithm to detect defects on the specimen.

In addition, wafer inspection system 100 may include peripheral devices useful to accept inputs from an operator (e.g., keyboard, mouse, touchscreen, etc.) and display outputs to the operator (e.g., display monitor). Input commands from an operator may be used by processor 131 to adjust threshold values used to control illumination characteristics, collection characteristics, wafer conditioning characteristics, etc. The resulting characteristics may be graphically presented to an operator on a display monitor.

Wafer inspection system 100 can use various imaging modes, such as bright field, dark field, and confocal. For example, in one embodiment, multiple zone imaging detector device 120 generates a bright field image. As illustrated in FIG. 1, some amount of light scattered from the surface of wafer 101 at a narrow angle is collected by objective lens 129. This light passes back through objective lens 129, collection optics 118A-B, and onto multiple zone imaging detector device 120. In this manner bright field images are generated by multiple zone imaging detector device 120.

In some embodiments, an aperture or Fourier filter, which can rotate in synchronism with the wafer, is placed at the back focal plane of objective lens 129. Various imaging modes such as bright field, dark field, and phase contrast can be implemented by using different apertures or Fourier filters. U.S. Pat. Nos. 7,295,303 and 7,130,039, which are incorporated by reference herein, describe these imaging modes in further detail. In another example, multiple zone imaging detector device 120 generates dark field images by imaging scattered light collected at larger field angles. In another example, a pinhole array that matches the layout of the illumination spot array can be placed in front of each imaging detector to generate a confocal image. U.S. Pat. No. 6,208,411, which is incorporated by reference herein, describes these imaging modes in further detail. In addition, various aspects of wafer inspection system 100 are described in U.S. Pat. Nos. 6,271,916 and 6,201,601, both of which are incorporated herein by reference.

In the embodiment illustrated in FIG. 1, wafer positioning system 102 moves wafer 101 under a stationary microscope. Wafer positioning system 102 includes a wafer chuck 103, motion controller 104, a X-translation stage 105, and a Y-translation stage (not shown). Wafer 101 is supported on wafer chuck 103. As illustrated in FIG. 1, translation stage 105 translates the wafer 101 in the X-direction at a specified velocity, $V_x$, and the Y-translation stage translates the wafer 101 in the Y-direction. Motion controller 104 coordinates the movements of wafer 101 by the X and Y translation stages to achieve the desired stepping or scanning motion of wafer 101 within wafer inspection system 100.

As illustrated in FIG. 1, a single primary illumination source 110 supplies the illumination energy for both the illumination beams. In some embodiments, illumination source 110 may be a broadband source. The broadband light may be separated into different wavelength bands supplied to different illumination optics to generate illumination beams of different wavelength. Similarly, light collected from the wafer surface may be separated into different wavelength bands and directed to different imaging detectors. As discussed herein, reflected and scattered light collected from the wafer surface may be associated with either illumination beam based on the field of view of each imaging detector. However, distinguishing between reflected and scattered light associated with each illumination beam may also be based on the wavelength of the collected light when different wavelength light is used to generate each illumination beam. In this manner, imaging detector signals originating from different illumination beams may be distinguished even when the fields of view of each imaging detector are located close together on the wafer surface.

Figure 5:
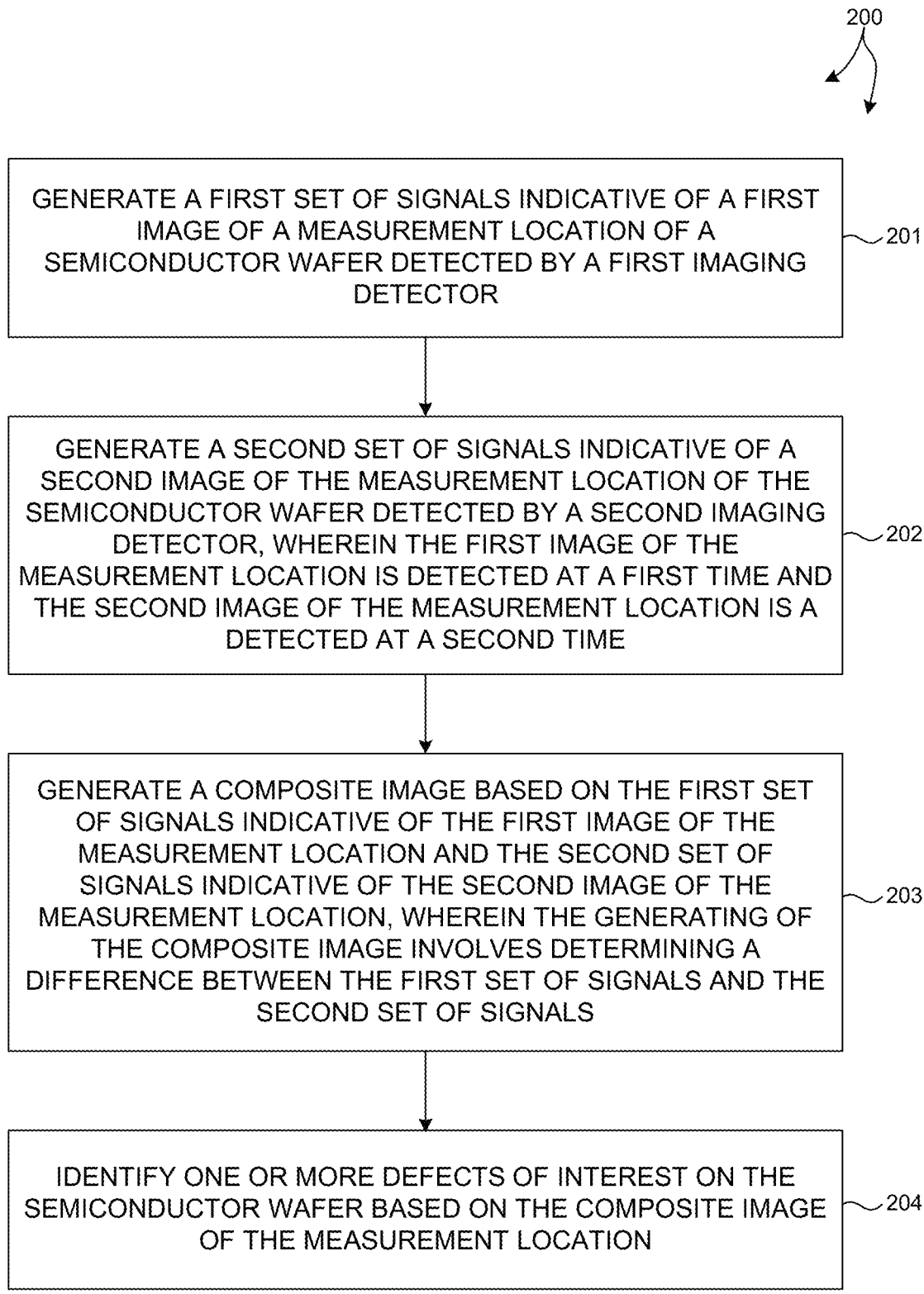
FIG. 5 is a flowchart illustrative of one exemplary method 200 of detecting defects on a wafer based on a composite image determined from images detected at different times.

FIG. 5 illustrates a method 200 of performing imaging based measurements of a measured area by multiple imaging detectors in at least one novel aspect. Method 200 is suitable for implementation by an inspection system such as inspection system 100 illustrated in FIG. 1. In one aspect, it is recognized that data processing blocks of method 200 may be carried out via a pre-programmed algorithm executed by one or more processors of computing system 130, or any other general purpose computing system. It is recognized herein that the particular structural aspects of system 100 do not represent limitations and should be interpreted as illustrative only.

In block 201, a first set of signals is generated indicative of a first image of a measurement location of a semiconductor wafer detected by a first imaging detector.

In block 202, a second set of signals is generated indicative of a second image of the measurement location of the semiconductor wafer detected by a second imaging detector. The first image of the measurement location is detected at a first time and the second image of the measurement location is detected at a second time.

In block 203, a composite image is generated based on the first set of signals indicative of the first image of the measurement location and the second set of signals indicative of the second image of the measurement location. Generating the composite image involves determining a difference between the first set of signals and the second set of signals.

In block 204, one or more defects of interest on the semiconductor wafer are identified based on the composite image of the measurement location.

It should be recognized that one or more steps described throughout the present disclosure may be carried out by a single computer system 130 or, alternatively, a multiple computer system 130. Moreover, different subsystems of system 100, may include a computer system suitable for carrying out at least a portion of the steps described herein. Therefore, the aforementioned description should not be interpreted as a limitation on the present invention but merely an illustration.

In addition, the computer system 130 may be communicatively coupled to the hyperspectral detectors in any manner known in the art. For example, the one or more computing systems 130 may be coupled to computing systems associated with the imaging detectors. In another example, the imaging detectors may be controlled directly by a single computer system coupled to computer system 130.

The computer system 130 of the system 100 may be configured to receive and/or acquire data or information from the subsystems of the system (e.g., imaging detectors and the like) by a transmission medium that may include wireline and/or wireless portions. In this manner, the transmission medium may serve as a data link between the computer system 130 and other subsystems of system 100.

Computer system 130 of system 100 may be configured to receive and/or acquire data or information (e.g., measurement results, modeling inputs, modeling results, reference measurement results, etc.) from other systems by a transmission medium that may include wireline and/or wireless portions. In this manner, the transmission medium may serve as a data link between the computer system 130 and other systems (e.g., memory on-board system 100, external memory, or other external systems). For example, the computing system 130 may be configured to receive measurement data from a storage medium (i.e., memory 132 or an external memory) via a data link. For instance, imaging data obtained using the imaging detectors described herein may be stored in a permanent or semi-permanent memory device (e.g., memory 132 or an external memory). In this regard, the measurement results may be imported from on-board memory or from an external memory system. Moreover, the computer system 130 may send data to other systems via a transmission medium. For instance, a composite image or an estimated parameter value determined by computer system 130 may be communicated and stored in an external memory. In this regard, measurement results may be exported to another system.

Computing system 130 may include, but is not limited to, a personal computer system, mainframe computer system, workstation, image computer, parallel processor, or any other device known in the art. In general, the term "computing system" may be broadly defined to encompass any device having one or more processors, which execute instructions from a memory medium.

Program instructions 134 implementing methods such as those described herein may be transmitted over a transmission medium such as a wire, cable, or wireless transmission link. For example, as illustrated in FIG. 1, program instructions 134 stored in memory 132 are transmitted to processor 131 over bus 133. Program instructions 134 are stored in a computer readable medium (e.g., memory 132). Exemplary computer-readable media include read-only memory, a random access memory, a magnetic or optical disk, or a magnetic tape.

As described herein, the term "critical dimension" includes any critical dimension of a structure (e.g., bottom critical dimension, middle critical dimension, top critical dimension, sidewall angle, grating height, etc.), a critical dimension between any two or more structures (e.g., distance between two structures), and a displacement between two or more structures (e.g., overlay displacement between overlaying grating structures, etc.). Structures may include three dimensional structures, patterned structures, overlay structures, etc.

As described herein, the term "critical dimension application" or "critical dimension measurement application" includes any critical dimension measurement.

As described herein, the terms "metrology system" or "inspection system" include any system employed at least in part to characterize a specimen in any aspect, including measurement applications such as critical dimension metrology, overlay metrology, focus/dosage metrology, and composition metrology. However, such terms of art do not limit the scope of the terms "inspection system" and "metrology system" as described herein. In addition, the system 100 may be configured for measurement of patterned wafers and/or unpatterned wafers. The system may be configured as a LED inspection tool, edge inspection tool, backside inspection tool, macro-inspection tool, or multi-mode inspection tool (involving data from one or more platforms simultaneously), and any other metrology or inspection tool that benefits from the imaging techniques described herein.

Various embodiments are described herein for a semiconductor wafer inspection system that may be used for measuring a specimen within any semiconductor processing system (e.g., an inspection system or a lithography system). The term "specimen" is used herein to refer to a wafer, a reticle, or any other sample that may be processed (e.g., printed or inspected for defects) by means known in the art.

As used herein, the term "wafer" generally refers to substrates formed of a semiconductor or non-semiconductor material. Examples include, but are not limited to, monocrystalline silicon, gallium arsenide, and indium phosphide. Such substrates may be commonly found and/or processed in semiconductor fabrication facilities. In some cases, a wafer may include only the substrate (i.e., bare wafer). Alternatively, a wafer may include one or more layers of different materials formed upon a substrate. One or more layers formed on a wafer may be "patterned" or "unpatterned." For example, a wafer may include a plurality of dies having repeatable pattern features.

A "reticle" may be a reticle at any stage of a reticle fabrication process, or a completed reticle that may or may not be released for use in a semiconductor fabrication facility. A reticle, or a "mask," is generally defined as a substantially transparent substrate having substantially opaque regions formed thereon and configured in a pattern. The substrate may include, for example, a glass material such as amorphous $SiO_2$. A reticle may be disposed above a resist-covered wafer during an exposure step of a lithography process such that the pattern on the reticle may be transferred to the resist.

One or more layers formed on a wafer may be patterned or unpatterned. For example, a wafer may include a plurality of dies, each having repeatable pattern features. Formation and processing of such layers of material may ultimately result in completed devices. Many different types of devices may be formed on a wafer, and the term wafer as used herein is intended to encompass a wafer on which any type of device known in the art is being fabricated.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Although certain specific embodiments are described above for instructional purposes, the teachings of this patent document have general applicability and are not limited to the specific embodiments described above. Accordingly, various modifications, adaptations, and combinations of various features of the described embodiments can be practiced without departing from the scope of the invention as set forth in the claims.

What is claimed is:

1. A semiconductor wafer inspection system comprising:
   a first imaging detector that generates a first set of signals indicative of a first image of a measurement location of a semiconductor wafer detected by the first imaging detector;
   a second imaging detector that generates a second set of signals indicative of a second image of the measurement location of the semiconductor wafer detected by the second imaging detector, wherein the first image of the measurement location is detected at a first time and the second image of the measurement location is detected at a second time that is temporally separated from the first time;
   an image combining device that generates a composite image based on the first set of signals indicative of the first image of the measurement location and the second set of signals indicative of the second image of the measurement location;
   a wafer positioning system operable to move the wafer in a scanning motion such that a field of view of the first imaging detector and a field of view of the second imaging detector move across the semiconductor wafer along an inspection path, wherein the field of view of the first imaging detector is located ahead of the field of view of the second imaging detector along the inspection path; and
   a computing system configured to identify one or more defects of interest on the semiconductor wafer based on the composite image of the measurement location.

2. The semiconductor wafer inspection system of claim 1, wherein the first time and the second time are temporally separated by at least 100 microseconds and no more than 10 milliseconds.

3. The semiconductor wafer inspection system of claim 1, wherein the first imaging detector and the second imaging detector are integrated into a multiple zone detector device.

4. The semiconductor wafer inspection system of claim 1, further comprising:
   a wafer conditioning device that changes an environmental condition of the measurement location between a time when the first image of the measurement location is detected and a time when the second image of the measurement location is detected.

5. The semiconductor wafer inspection system of claim 4, wherein the environmental condition is an electrical field at the surface of the semiconductor wafer, a humidity at the surface of the semiconductor wafer, a temperature at the surface of the semiconductor wafer, or a combination thereof.

6. The semiconductor wafer inspection system of claim 1, wherein a focus offset at the semiconductor wafer associated with the first image is different from a focus offset at the semiconductor wafer associated with the second image.

7. The semiconductor wafer inspection system of claim 1, further comprising:
   one or more illumination sources configured to generate an amount of optical radiation; and
   one or more optical elements configured to receive the amount of optical radiation and direct a first amount of incident illumination light to the semiconductor wafer within a field of view of the first imaging detector and a second amount of incident illumination light to the semiconductor wafer within a field of view of the second imaging detector.

8. The semiconductor wafer inspection system of claim 7, wherein the first amount of incident illumination light and the second amount of incident illumination light differ from one another in optical intensity, wavelength spectrum, polarization, pupil image, or a combination thereof.

9. The semiconductor wafer inspection system of claim 1, wherein the first and second imaging detectors are charge-coupled device (CCD) detectors or complementary metal on silicon (CMOS) detectors.

10. The semiconductor wafer inspection system of claim 1, wherein the first and second imaging detectors operate in a time delay integration (TDI) mode.

11. The semiconductor wafer inspection system of claim 1, wherein the generating of the composite image involves determining a difference between the first set of signals and the second set of signals on a pixel by pixel basis.

12. A semiconductor wafer inspection system comprising:
a first imaging detector that generates a first set of signals indicative of a first image of a measurement location of a semiconductor wafer detected by the first imaging detector;
a second imaging detector that generates a second set of signals indicative of a second image of the measurement location of the semiconductor wafer detected by the second imaging detector, wherein the first image of the measurement location is detected at a first time and the second image of the measurement location is detected at a second time;
an image combining device that generates a composite image based on the first set of signals indicative of the first image of the measurement location and the second set of signals indicative of the second image of the measurement location, wherein the generating of the composite image involves determining a difference between the first set of signals and the second set of signals;
a wafer positioning system operable to move the wafer in a scanning motion such that a field of view of the first imaging detector and a field of view of the second imaging detector move across the semiconductor wafer along an inspection path, wherein the field of view of the first imaging detector is located ahead of the field of view of the second imaging detector along the inspection path; and
a computing system configured to identify one or more defects of interest on the semiconductor wafer based on the composite image of the measurement location.

13. The semiconductor wafer inspection system of claim 12, wherein the first time is temporally separated from the second time by at least 100 microseconds and no more than 10 milliseconds.

14. The semiconductor wafer inspection system of claim 12, wherein the difference between the first set of signals and the second set of signals is determined on a pixel by pixel basis.

15. The semiconductor wafer inspection system of claim 12, wherein the first imaging detector and the second imaging detector are integrated into a multiple zone detector device.

16. The semiconductor wafer inspection system of claim 12, further comprising:
a wafer conditioning device that changes an environmental condition of the measurement location between a time when the first image of the measurement location is detected and a time when the second image of the measurement location is detected.

17. The semiconductor wafer inspection system of claim 12, wherein a focus offset at the semiconductor wafer associated with the first image is different from a focus offset at the semiconductor wafer associated with the second image.

18. The semiconductor wafer inspection system of claim 12, wherein a first amount of incident illumination light directed to the semiconductor wafer within a field of view of the first imaging detector differs from a second amount of incident illumination light directed to the semiconductor wafer within a field of view of the second imaging detector in optical intensity, wavelength spectrum, polarization, pupil image, or a combination thereof.

19. A method comprising:
generating a first set of signals indicative of a first image of a measurement location of a semiconductor wafer detected by a first imaging detector;
generating a second set of signals indicative of a second image of the measurement location of the semiconductor wafer detected by a second imaging detector, wherein the first image of the measurement location is detected at a first time and the second image of the measurement location is detected at a second time;
generating a composite image based on the first set of signals indicative of the first image of the measurement location and the second set of signals indicative of the second image of the measurement location, wherein the generating of the composite image involves determining a difference between the first set of signals and the second set of signals;
moving the semiconductor wafer in a scanning motion such that a field of view of the first imaging detector and a field of view of the second imaging detector move across the semiconductor wafer along an inspection path, wherein the field of view of the first imaging detector is located ahead of the field of view of the second imaging detector along the inspection path; and
identifying one or more defects of interest on the semiconductor wafer based on the composite image of the measurement location.

* * * * *